(12) United States Patent
Satoda et al.

(10) Patent No.: US 6,285,392 B1
(45) Date of Patent: Sep. 4, 2001

(54) MULTI-SITE TELEVISION CONFERENCE SYSTEM AND CENTRAL CONTROL APPARATUS AND CONFERENCE TERMINAL FOR USE WITH THE SYSTEM

(75) Inventors: Kozo Satoda; Ryuichi Hiraike, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/447,268

(22) Filed: Nov. 23, 1999

(30) Foreign Application Priority Data

Nov. 30, 1998 (JP) .................................................. 10-339131

(51) Int. Cl.⁷ .................................................. G02F 1/1335
(52) U.S. Cl. .................................... 348/14.09; 348/14.08; 348/14.1
(58) Field of Search .............................. 348/14.01, 14.02, 348/14.03, 14.04, 14.05, 14.07, 14.08, 14.09; 345/330, 331; 709/204, 205; 379/202; 370/260, 261; H04N 7/14, 7/15

(56) References Cited

U.S. PATENT DOCUMENTS 5,999,208 * 12/1999 McNerney et al. ................ 348/14.09

FOREIGN PATENT DOCUMENTS

| | | |
|---|---|---|
| 5-316504 | 11/1993 | (JP) . |
| 6-351013 | 12/1994 | (JP) . |
| 7-67035 | 3/1995 | (JP) . |
| 7-184180 | 7/1995 | (JP) . |
| 407184180A * | 7/1995 | (JP) .................................. H04N/7/15 |
| 9-37224 | 2/1997 | (JP) . |
| 9-116882 | 5/1997 | (JP) . |
| 10-56626 | 2/1998 | (JP) . |

* cited by examiner

Primary Examiner—Curtis Kuntz
Assistant Examiner—Melur Ramakrishnaiah
(74) Attorney, Agent, or Firm—Young & Thompson (57) ABSTRACT

The invention provides a multi-site television conference system which provide natural video images and acoustic images which provide a good feeling of presence to participants who participate in a conference through respective conference terminals. A plurality of cameras are connected to each of conference terminals located at different sites remote from each other and pick up video images of a participant who uses the conference terminal. A central control unit receives, at a multi-site image inputting section thereof, from the conference terminals, video images of participants of the respective conference terminals picked up in multi-directions. An image selection section of the central control unit selects video images of the participants of the conference terminals taking it into consideration how the other conference participants looks to each participant in a virtual conference space and synthesizes the video images into the virtual conference space, and then transmits resulting video images to the conference terminals so that the conference terminals may present computer graphics images to the participants.

7 Claims, 12 Drawing Sheets

FRONT IMAGE IS ARRANGED WITH REFERENCE TO DESK (B)

SIDEWARDLY DIRECTED IMAGE IS ARRANGED IN ACCORDANCE WITH EYES

CENTRAL
CONNECTION
(CONNECTION
NUMBER: 5)

(B)

1:1 CONNECTION
(CONNECTION
UMBER: 10)

FIG.10

PRIOR ART

PRIOR ART

FIG.12

PRIOR ART

MULTI-SITE TELEVISION CONFERENCE SYSTEM AND CENTRAL CONTROL APPARATUS AND CONFERENCE TERMINAL FOR USE WITH THE SYSTEM

BACKGROUND OF THE INVENTION

1. Field of the Invention

The present invention relates to a multi-site television conference system and a central control apparatus and a conference terminal for use with the multi-site television conference system.

2. Description of the Related Art

Figure 10:
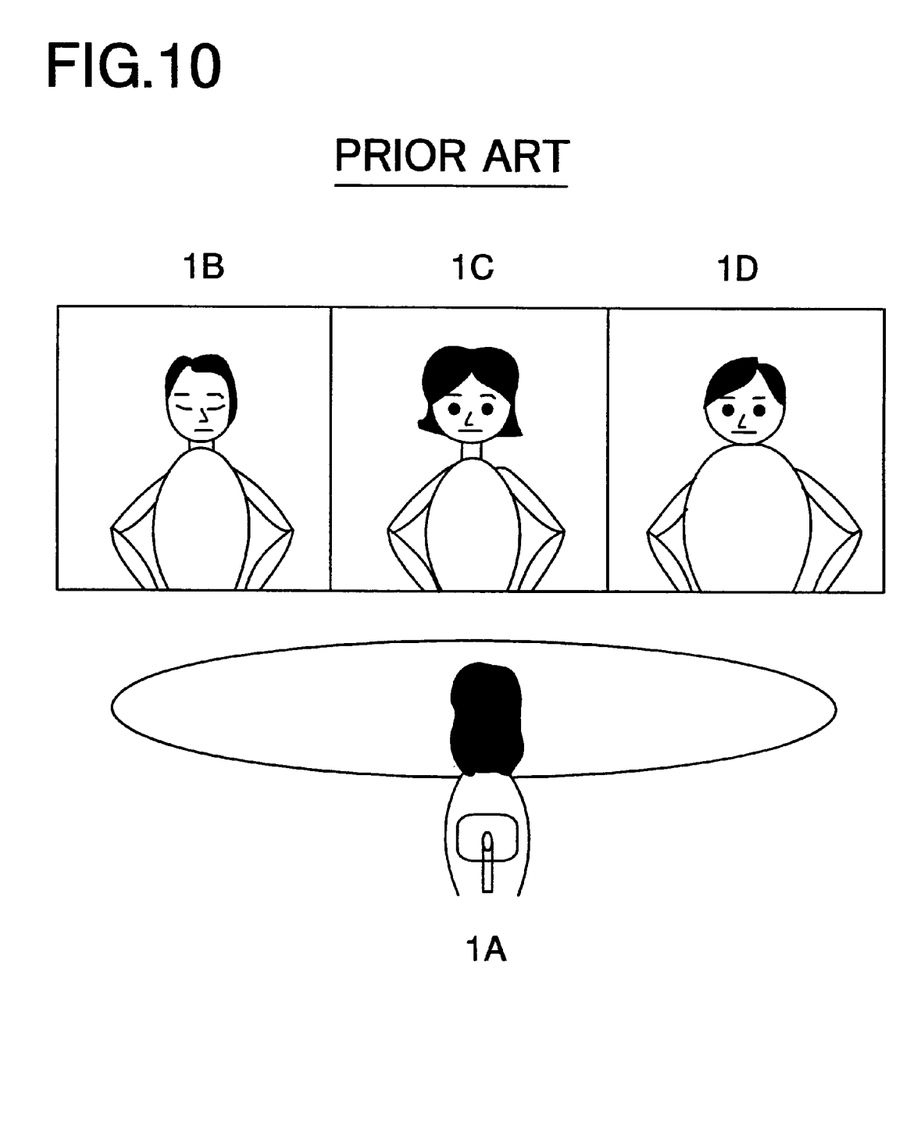
FIG. 10 is a schematic view illustrating a manner of presenting images of participants in a conventional television conference.

Conventionally, a multi-site television conference system presents, to each participant to a television conference, images of participants at the other sites using several techniques. One of the techniques is illustrated in FIG. 10. Referring to FIG. 10, a participant 1A observes images 1B, 1C and 1D at the other sites which are displayed in multi-windows on a single monitor or individually displayed on a plurality of monitors. The technique, however, is disadvantageous in that it cannot be recognized readily who is talking at present and the talking condition is unnatural in that the eyes of the talking person and the eyes of the persons who are listening to the talking person do not coincide with each other.

Figure 11:
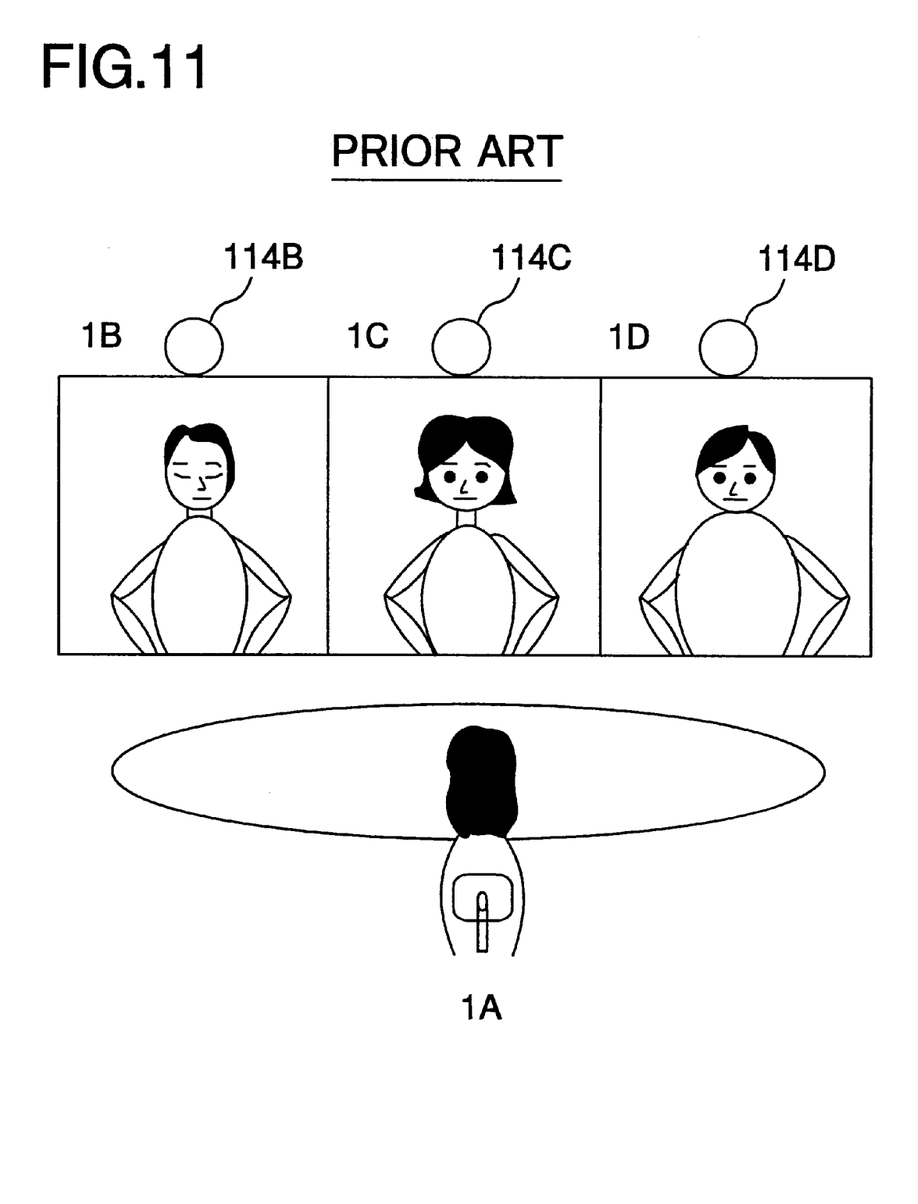
FIG. 11 is a schematic view illustrating another manner of presenting images of participants wherein coincidence of the eyes is achieved in a conventional television conference.

A solution to the problem is disclosed in Japanese Patent Laid-Open No. Hei 6-351013, in which a plurality of cameras are used. The improved technique is illustrated in FIG. 11. Referring to FIG. 11, cameras 114B, 114C and 114D are arranged at locations in a monitor at which the images 1B, 1C and 1D of the individual participants are displayed. An image picked up by the camera 114B is transmitted to a terminal of the participant of the image 1B, and images picked up by the cameras 114C and 114D are transmitted to the participants of the cameras 1C and 1D. Also the camera for any other participant if it is present is arranged similarly.

With the arrangement described above, for example, if the participant 1A talks to the image 1B, then an image of the participant 1A as viewed from the front is displayed on the image 1B, but images of the participant 1A as viewed from the sides are displayed on the images 1C and 1D. According to the technique, a feeling of presence of each participant in a conference is increased by coincidence of the eyes. However, where n participants at different sites are involved, n−1 cameras must be provided for a terminal of each of the participants. Therefore, as the number of participants increases, it becomes difficult to install a necessary number of cameras.

A further technique which augments the feeling of presence is disclosed in Japanese Patent Laid-Open No. Hei 7-67035 wherein the computer graphics (CG) is utilized to produce and present an image of an imaginary conference space to a participant. According to the technique, images of participants are arranged on the background of a conference room including a table and so forth so that each participant may have a feeling of participation in the conference. This technique adopts also the technique for establishing coincidence of the eyes by means of a plurality of cameras proposed in Japanese Patent Laid-Open No. Hei 6-351013 mentioned hereinabove and similarly has a problem that, as the number of participants increases, it is difficult to install cameras for them.

In this manner, since the conventional television conference systems provide a feeling of presence in a conference to each participant by making the eyes principally of a talking person and one of the other participants, where n participants participate in the conference, n−1 cameras must be installed for each terminal, which makes implementation of the television conference system difficult.

SUMMARY OF THE INVENTION

It is an object of the present invention to provide a multi-site television conference system and a central control apparatus and a conference terminal for use with the multi-site television conference system by which an image of a virtual conference space which provides a good feeling of presence can be produced using a comparatively small number of cameras.

In order to attain the object described above, according to an aspect of the present invention, there is provided a multi-site television conference system, comprising a central control unit for controlling a conference, and a plurality of conference terminals connected to the central control unit, each of the conference terminals including a plurality of image pickup apparatus for picking up video images of a participant, who participates in the conference through the conference terminal, from a plurality of directions, a multi-direction image inputting section for receiving the video images from the plurality of image pickup apparatus and transmitting the video images to the central control unit, an image outputting section for receiving a video image of a virtual conference room transmitted thereto from the central control unit and presenting the received video image to the participant, and a control information inputting section for inputting information for controlling the conference therethrough and transmitting the inputted information to the central control unit, the central control unit including a multi-site image inputting section for receiving video images transmitted thereto from the conference terminals of individual participants to the conference, an image production timing generation section for designating one of the participants who should see a video image to be synthesized by and transmitted from the central processing unit in order that video images may be produced and transmitted to the conference terminals of the individual participants, a virtual space information storage section for storing information to be used for production of a video image of the virtual conference space, updating the information of the virtual conference space with control information from the conference terminals and transmitting the information to be used for production of a video image in response to an instruction from the image production timing generation section, an image selection section for selecting appropriate video images from among the multi-direction video images received by the multi-site image inputting section by distinguishing how, when the participant for which a video image is being produced at present views the participants of the other conference terminals in the virtual conference space based on the information from the virtual space information storage section, the participants look to the participant, and an image production section for producing a video image in which the video images selected by the image selection section are arranged in the virtual conference space based on the information from the virtual space information storage section and transmitting the produced video image to the conference terminal of the participant.

Preferably, the image selection section of the central control unit has a function of producing, when the multi-direction video images received by the multi-site image inputting section do not include an appropriate video image, an appropriate video image using a plurality of ones of the multi-direction video images.

Preferably, each of the conference terminals further includes a speech inputting section for inputting speech of the conference participant therethrough and transmitting the inputted speech to the central control unit, and a speech outputting section for receiving speech synthesized by the central control unit and presenting the received speech to the participant, the virtual space information storage section of the central control unit further being capable of storing information to be used for production of an acoustic image of the virtual conference space, updating the information of the virtual conference space with control information from the conference terminals and transmitting the information to be used for production of an acoustic image, and the central control unit further includes a multi-site speech inputting section for receiving speech transmitted thereto from the conference terminals of the individual participants, and an acoustic image synthesis section for producing an appropriate acoustic image by distinguishing how, when the participant for which speech is being produced hears speech of the participants of the other conference terminals in the virtual conference space based on the information from the virtual space information storage section, the speech sounds to the participant from among the speech from the multi-sites and transmitting the produced acoustic image to the conference terminal of the participant.

While, in the multi-site television conference system, the central control unit and the conference terminals are individually connected to each other, if every two conference terminals are connected directly each other and each conference terminal produces an image therefor, then the central control unit can be omitted and the time required for production of images for all of the conference terminals can be reduced.

Thus, according to another aspect of the present invention, there is provided a multi-site television conference system, comprising a plurality of conference terminals located at different sites from each other and connected to each other, each of the conference terminals including a plurality of image pickup apparatus for picking up video images of a participant, who participates in a conference through the conference terminal, from a plurality of directions, a multi-direction image inputting section for receiving the video images from the plurality of image pickup apparatus and transmitting the video images to the other ones of the plurality of conference terminals connected thereto, a control information inputting section for receiving information for controlling the conference from the participant and transmitting the received information to the other conference terminals, a multi-site image inputting section for receiving video images transmitted thereto from the other conference terminals, a virtual space information storage section for storing information to be used for production of a video image of a virtual conference space, updating the information of the virtual conference space with the control information received from the other conference terminals and outputting the information to be used for production of a video image, an image selection section for selecting appropriate video images from among the multidirection video images received from the other conference terminals by distinguishing how, when the participant of the conference terminal views the participants of the other conference terminals in the virtual conference space based on the information from the virtual space information storage section, the participants look to the participant of the conference terminal, and an image production section for producing a video image in which the video images selected by the image selection section are arranged in the virtual conference space based on the information from the virtual space information storage section such that the participants of the plurality of conference terminals share the virtual conference space.

The above and other objects, features and advantages of the present invention will become apparent from the following description and the appended claims, taken in conjunction with the accompanying drawings in which like parts or elements are denoted by like reference symbols.

DESCRIPTION OF PREFERRED EMBODIMENTS

Figure 1:
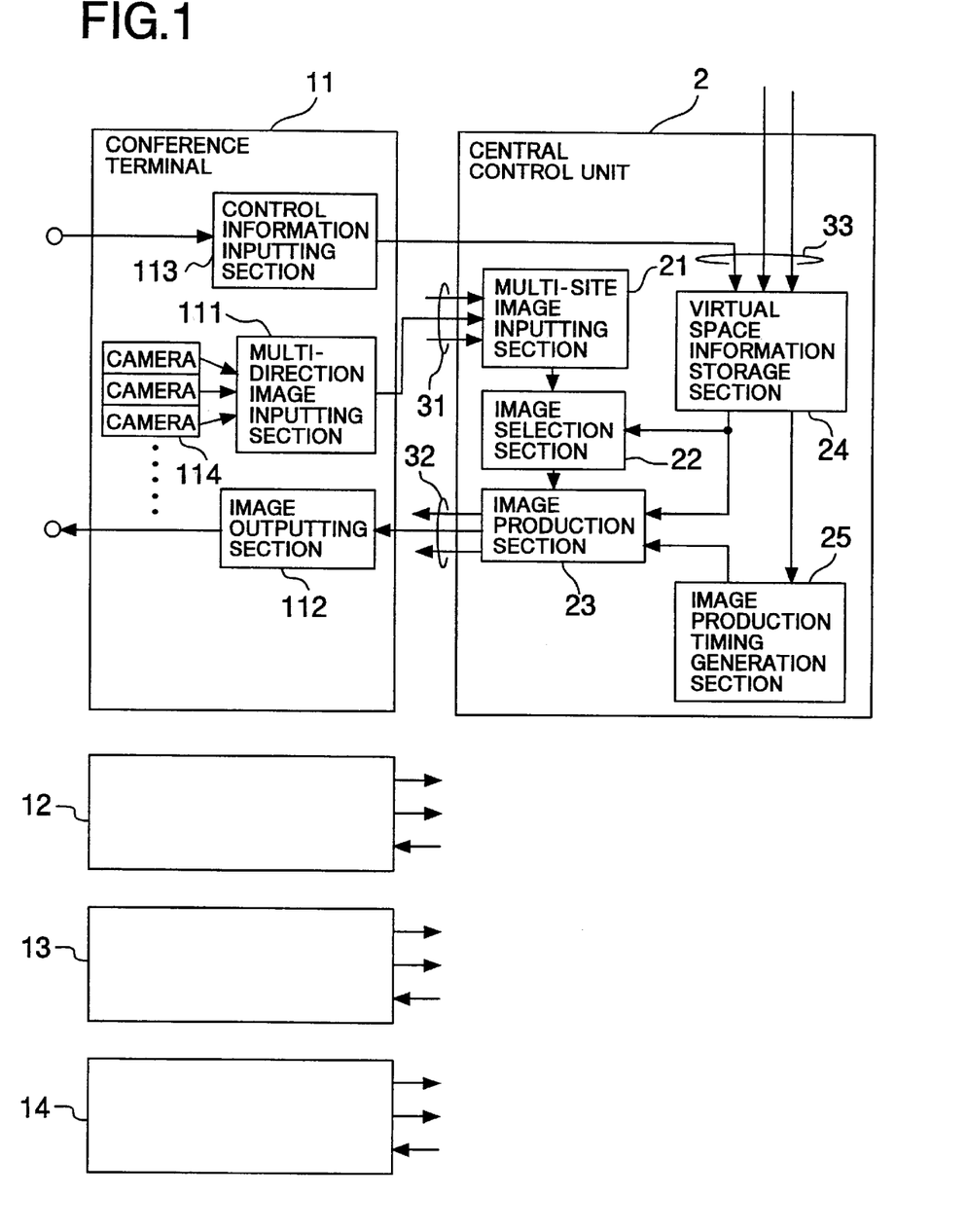
FIG. 1 is a block diagram showing an image and speech synthesis apparatus for a multi-site conference to which the present invention is applied.

Referring to FIG. 1, there is shown an image and speech synthesis apparatus for a multi-site conference to which the present invention is applied.

The image and speech synthesis apparatus for a multi-site conference includes a plurality of conference terminals for allowing participants at remote locations to participate in a television conference, and a central control unit 2 for centrally controlling the television conference. The image and speech synthesis apparatus for a multi-site conference shown in FIG. 1 is constructed supposing that participants at four sites participate in a multi-site conference and individually have conference terminals 11 to 14 connected to the single central control unit 2 over a network. The conference terminals 11 to 14 have similar constructions to each other, and for simplified description, a construction only of the conference terminal 11 is hereinafter described as a representative of them. It is apparent that the image and speech synthesis apparatus for a multi-site conference can be expanded readily so that participants at n sites may participate in a multi-site conference.

The conference terminal 11 includes a plurality of cameras 114 for picking up an image of a participant from a plurality of directions. Actually, at least three cameras 114 are prepared and disposed so that a participant may be imaged from the front, front left and front right from of the participant. Although the cameras 114 need not necessarily be disposed at precise positions, where they are disposed at precisely measured positions, images which provide a good feeling of presence can be produced.

Figure 5:
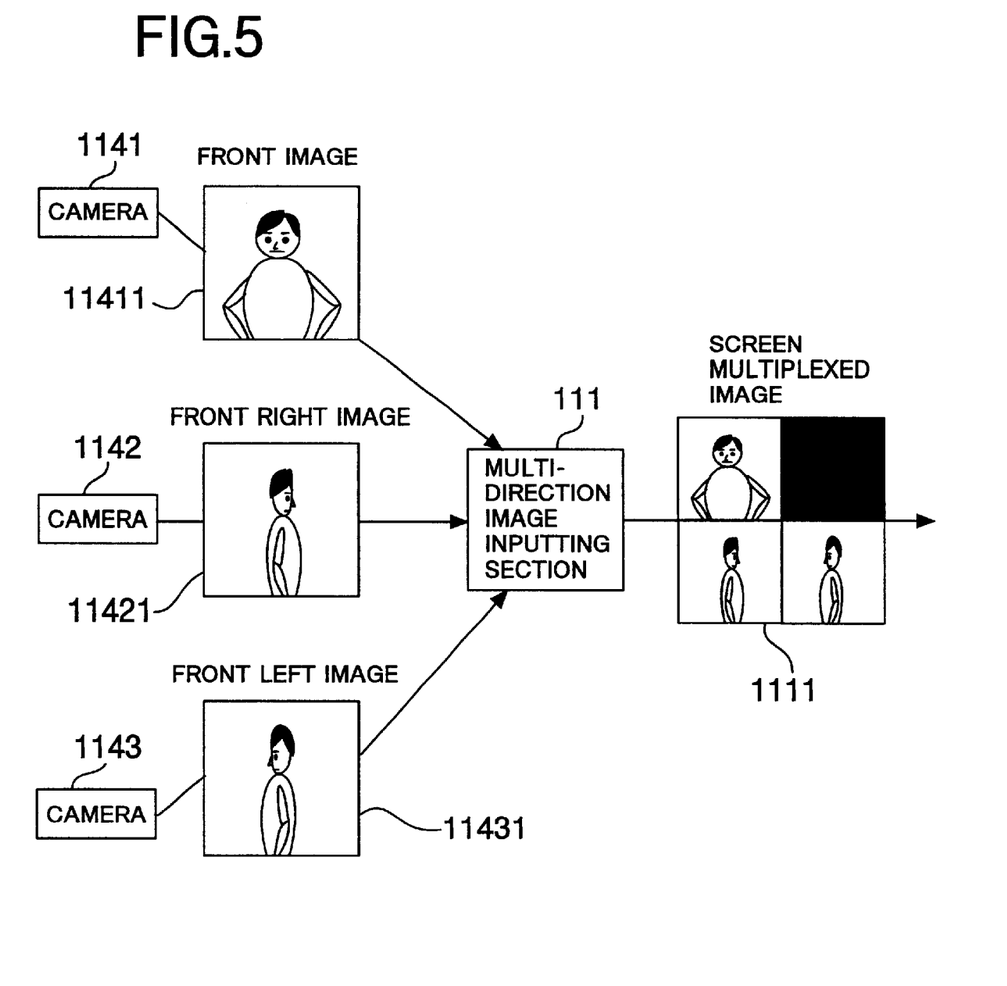
FIG. 5 is a schematic diagrammatic view showing a multi-direction image inputting section of the image and speech synthesis apparatus for a multi-site conference of FIG. 1 which multiplexes images picked up from a plurality of directions into a single screen and transmits the screen.

Images of the cameras 114 which image the participant from the plurality of directions are inputted to a multi-direction image inputting section 111 and then transmitted to the central control unit 2. Upon such transmission, the images from the plurality of directions may be transmitted time-divisionally, or may be transmitted in such a form that they are combined in different divisional areas of a screen where the screen is divided into four, nine or sixteen areas as seen from FIG. 5. The images combined in this manner are sent to the central control unit 2.

Figure 6:
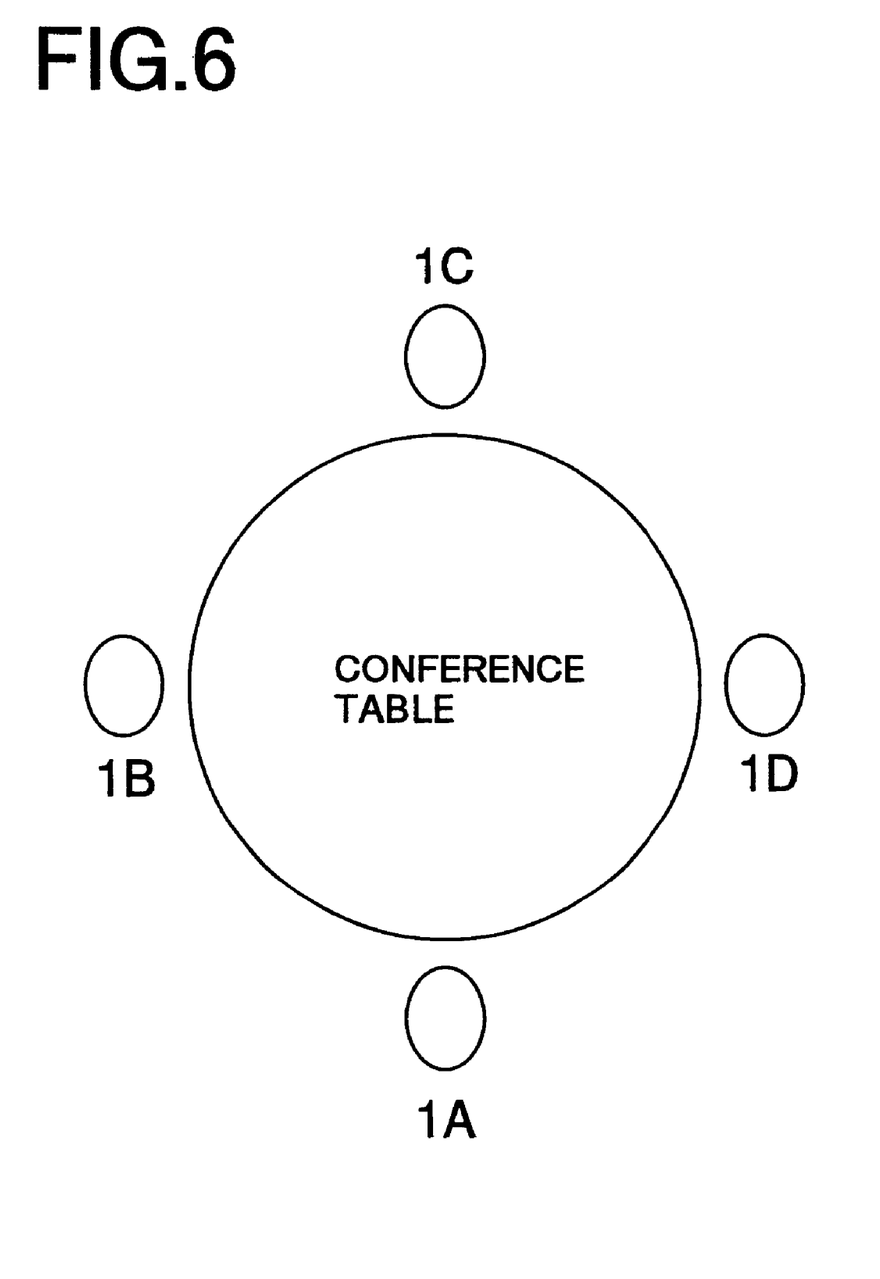
FIG. 6 is a schematic view showing an example of arrangement of participants in a virtual conference space where four participants are involved.

In the central control unit 2, a multi-site image inputting section 21 receives inputs from the multi-direction image inputting sections 111 of the conference terminals 11 to 14. The central control unit 2 produces an image of a virtual conference room and transmits it to the conference terminals 11 to 14. The virtual conference room includes three-dimensional models of computer graphics representing, for example, a table in and the inside of the conference room and images of participants of the individual terminals sitting around the table. Information regarding the virtual space of at which locations the three-dimensional models of the desk and other objects in the conference room and the participants should be arranged in the virtual conference room is managed by a virtual space information storage section 24. In the description here, a virtual space is supposed wherein a conference is held by four participants sitting around a conference table as seen in FIG. 6.

Since each participant is present in the virtual conference room and participates in a conference, when each participant is arranged at its respective position in the virtual space, it is natural that each participant sees the virtual conference room from a location at which the participant is arranged. Accordingly, in the arrangement of FIG. 6, when the virtual conference room is viewed from the participant at the location 1A, the participant 1C looks in the front while the participant 1D looks in the front right and the participant 1B looks in the front left. On the other hand, when the virtual conference room is viewed from the participant 1B, the participant 1D looks in the front and the participant 1A looks in the front right while the participant 1C looks in the front left.

In other words, the image of the virtual conference space which is viewed by each participant on its terminal is different among the different conference terminals. The central control unit 2 is required to produce all of such different images and transmit them to the respective conference terminals. To this end, the central control unit 2 includes an image production timing generation section 25 for producing a timing representing for which one of the conference terminals an image is produced at present. The image production timing generation section 25 transmits an ID of that one of the conference terminals for which an image must be produced at present to the virtual space information storage section 24.

The virtual space information storage section 24 produces, based on the ID of the conference terminal, information of a view point position of the image of the virtual space being produced at present, the direction of the eyes and relative positions of the other conference participants as viewed from the position, and transmits the information to an image selection section 22 and an image production section 23. For example, if the image production timing generation section 25 transmits timing information that an image for the participant 1A is being produced at present, then the virtual space information storage section 24 designates the view point position of the participant 1A as a position of the eyes for producing a virtual space image and transmits distinction information of different looking manners that the participant 1B looks on the front left, the participant 1C looks on the front and the participant 1D looks on the front right to the image selection section 22 and the image production section 23.

The image selection section 22 selects, from among the images picked up from the participants at the multi-sites from multiple directions and received by the multi-site image inputting section 21, the camera image of the participant 1B as imaged from the front right, the camera image of the participant 1C as imaged from the front and the camera image of the participant 1D as imaged from the front left, and transmits the selected images to the image production section 23. The image production section 23 arranges the images of the participants selected by the image selection section 22 in the virtual conference space into the three-dimensional model of the conference room transmitted thereto from the virtual space information storage section 24 to produce an image of the virtual conference space as viewed from the point of view of the participant 1A. Then, the image is transmitted to the conference terminal of the participant 1A at a timing set by the image production timing generation section 25.

After the transmission of the image to the conference terminal of the participant 1A, the image production timing generation section 25 passes to a next timing so that an image for the participant 1B may be produced. In this manner, the central control unit 2 successively performs such image production as described above for all of the participants and transmits resulting images to the respective terminals. Each of the conference terminals 11 to 14 receives an image transmitted thereto from the central control unit 2 by means of an image outputting section 112 and presents the image to the user of the terminal. A control information inputting section 113 transmits information other than image information to the central control unit 2.

For example, in order to allow a participant to newly participate in a conference through one of the conference terminals 11 to 14, a participation request from the terminal of the participant is received by the virtual space information storage section 24 of the central control unit 2, and the virtual space information storage section 24 arranges the new participant at an appropriate position in the virtual space. Then, the virtual space information storage section 24 informs the image production timing generation section 25 of presence of the new participant. As a result, an image of the new participant is arranged in the virtual conference space, and also the participant is allowed to observe an image of the conference space.

Here, if the background of an image selected by the image selection section 22 is removed and made transparent so that only the images of the participants are presented in the virtual conference space, then the feeling of presence that the participants participate in the conference space increases. Such removal of the background can be achieved by various methods. For example, the background is covered with a special blue cloth or the like and is removed based on color information of the cloth, or an image of the background is picked up in advance and differences thereof from the images of the participants are detected to extract only the images of the participants. Otherwise, only the images of the participants are extracted by a stereo method using a plurality of cameras.

Figure 7:
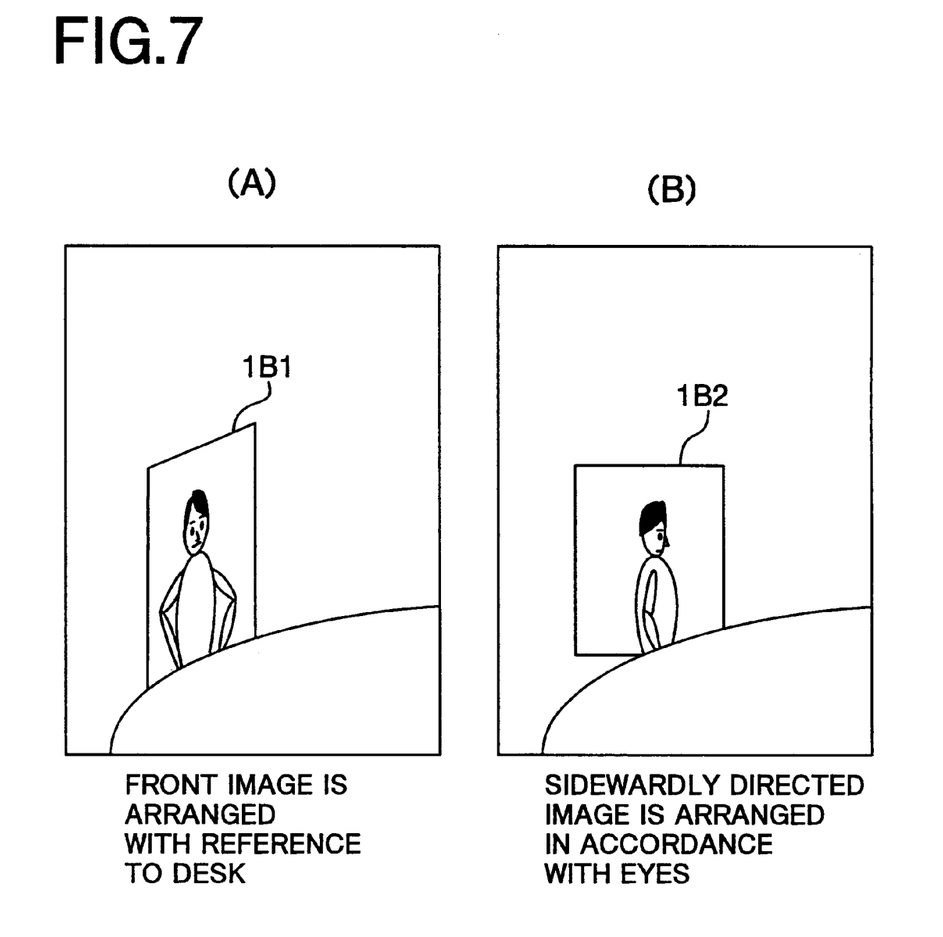
FIGS. 7(A) and 7(B) are schematic views illustrating a manner of arrangement of an image of a participant positioned at a sideward position so that it may look natural.
Figure 12:
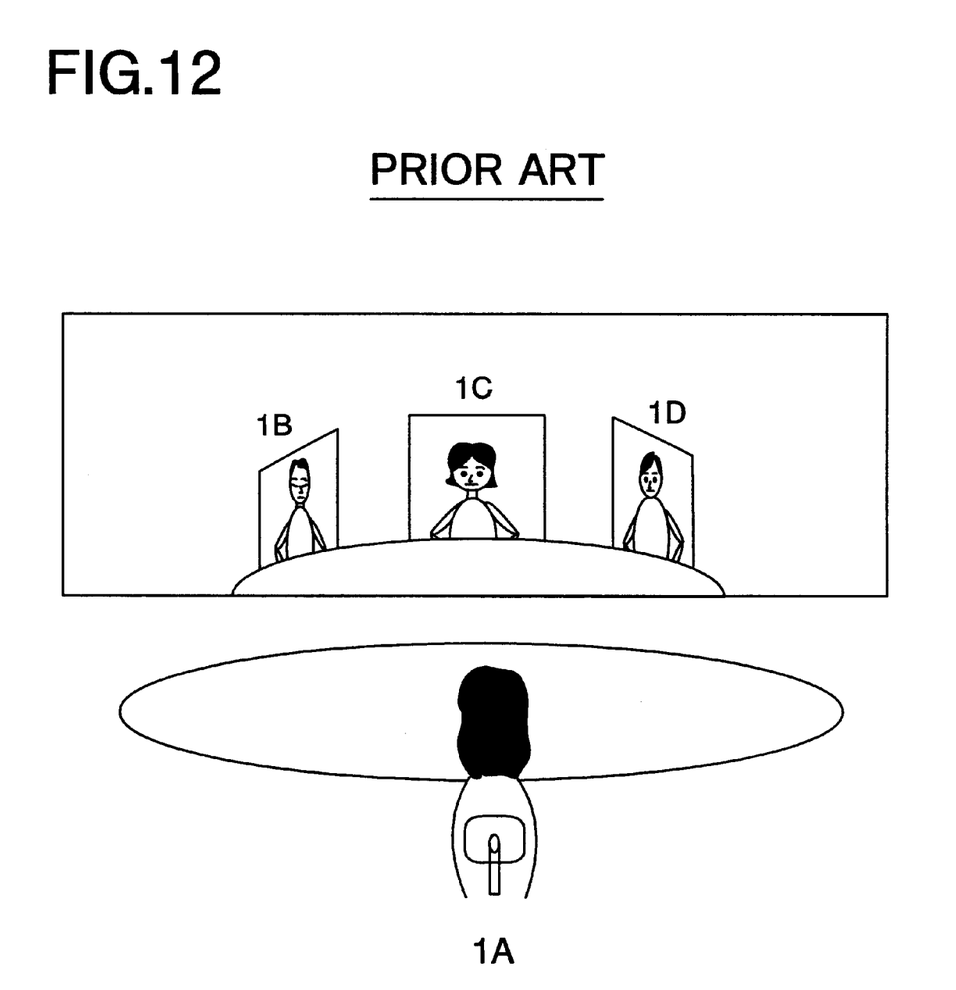
FIG. 12 is a schematic view illustrating a further manner of presenting images of participants wherein images are presented by computer graphics in a conventional television conference.

FIGS. 7(A) and 7(B) illustrate an example of arrangement of an image for augmenting the feeling of presence. As can be recognized from the conventional technique described hereinabove with reference to FIG. 12, where images of participants are arranged around a table of a three-dimensional model, even if an image in the front is arranged as it is, it does not give any unfamiliar feeling, but if, in order to produce an image of a participant who sits leftwardly or rightwardly of the table, an image of the participant as viewed from the front is arranged in an inclined relationship, for example, as seen in FIG. 7(A), then the angle of view of the image of the participant is reduced and the image of the participant becomes less realistic because it is displayed thinner.

According to the present invention, an image of a participant as viewed from a side is arranged as it is perpendicularly to the direction of the eyes as seen in FIG. 7(B). Consequently, an image which looks natural on the screen can be produced. However, where a camera image from a precise position cannot be obtained because the number of cameras installed is comparatively small or by some other reason, the conventional technique of arranging an image of a participant in an inclined relationship may be employed in combination to produce a quasi eyes-coincident image.

Further, a conference may take various forms including a form wherein participants sit around a table as seen in FIG. 6 and another form which is used mainly in and suitable for presentation. Thus, the atmosphere of a conference can be changed by storing configuration models of various conference rooms in the virtual space information storage section 24 and changing three-dimensional models to be used in accordance with a form of the conference to be held. Also adjustment of the arrangement of participants upon such change can be performed readily.

In the above-described image and speech synthesis apparatus for a multi-site conference to which the present invention is applied, in order to produce an image to be viewed from the participant 1A, images as viewed from the front or from a side are selected from among the images of the participants 1B, 1C and 1D. However, where the image and speech synthesis apparatus for a multi-site conference is constructed in such a manner as described above, in order to produce an image which provides a feeling of presence with the eyes made fully coincident, the camera for the participant 1B must be placed at a position on the participant 1A at which an image of the participant 1B is to be disposed. Therefore, the image and speech synthesis apparatus for a multi-site conference cannot cope with such a situation that the number of participants increases considerably or the layout is changed depending upon the atmosphere of the conference. In this instance, the image and speech synthesis apparatus for a multi-site conference can additionally adopt the conventional technique of arranging an image in an inclined relationship to obtain a quasi eyes-coincident image as described above. However, it is difficult to obtain a precise eyes-coincident image.

Figure 2:
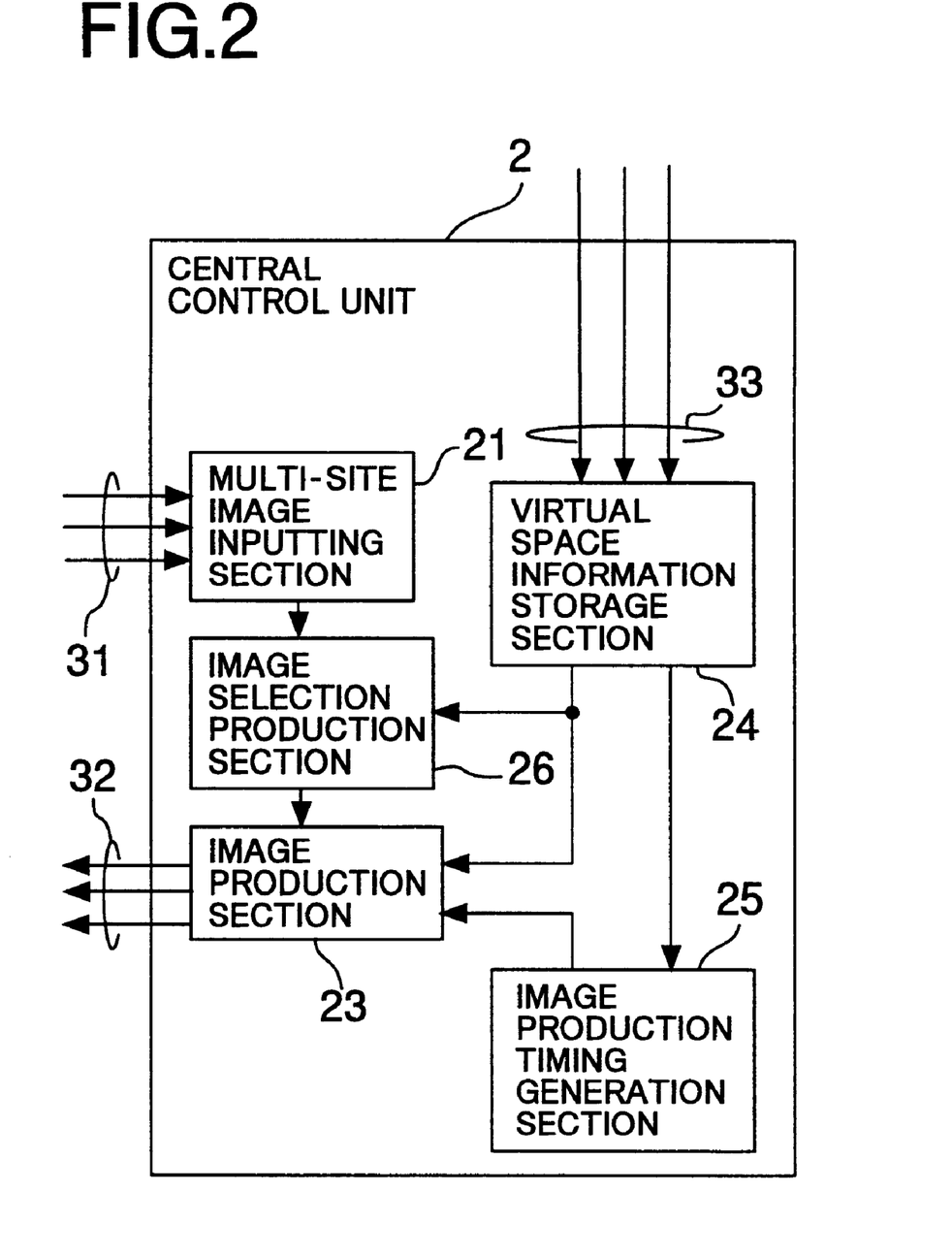
FIG. 2 is a block diagram showing another form of a central control unit of the image and speech synthesis apparatus for a multi-site conference of FIG. 1.

FIG. 2 shows a modification to the central control unit 2 of the image and speech synthesis apparatus for a multi-site conference described hereinabove with reference to FIG. 1. Referring to FIG. 2, the modified central control unit 2 includes an image selection production section 26 in place of the image selection section 22. Also the image selection production section 26 selects appropriate images similarly to the image selection section 22. However, the image selection production section 26 has an additional function of producing and outputting, when an image conforming to the arrangement of a camera is not available, an image as viewed from a desired direction based on images as viewed from different directions inputted thereto from a conference terminal.

Figure 8:
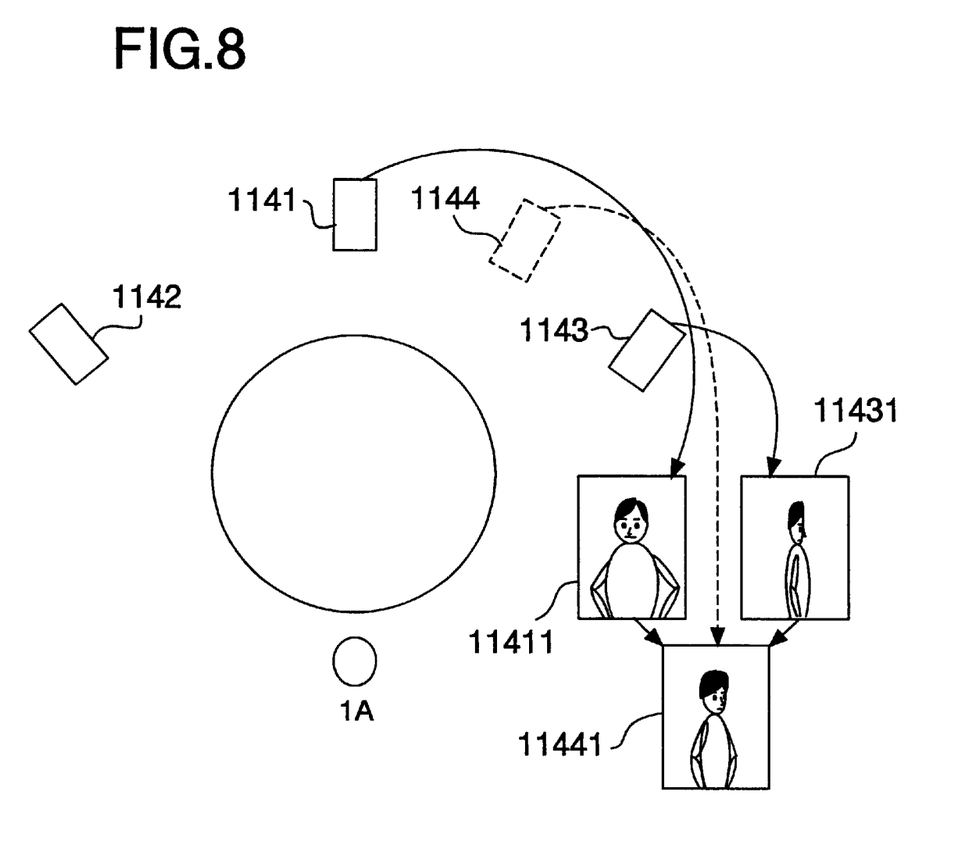
FIG. 8 is a schematic diagrammatic view illustrating a method of producing an image as viewed from a necessary direction where a suitable camera position is not available.

For example, referring to FIG. 8, while an image of the participant 1A picked up from a camera 1144 is desired, only images 11411 and 11431 of two cameras 1141 and 1143 may possibly be available. In this instance, the image selection production section 26 produces an image 11441 from the two images 11411 and 11431. More particularly, if an image from the most appropriate position is not available, then the image selection production section 26 selects images as viewed from two nearest positions and produces a necessary image from the images using an image morphing technique or the like.

In this instance, if the positions of the cameras at the conference terminals 11 to 14 are known precisely, then if the virtual space information storage section 24 has the camera arrangement information, then an image which provides a good feeling of presence can be obtained by calculating accurate parameters for transforming an image. However, since such precise arrangement is generally difficult, it is possible to produce an image using parameters set for such directions as the front, the front left at 45 degrees and the front right at 45 degrees.

With the image and speech synthesis apparatus for a multi-site conference which includes the central control unit 2 described hereinabove with reference to FIG. 1 or 2, to each participant to a conference, a natural image of a conference space with coincidence of the eyes achieved can be presented by arranging images of the other participants to the conference in a virtual conference space of computer graphics. Consequently, an image which provides a good feeling of present can be presented to each conference participant.

Figure 3:
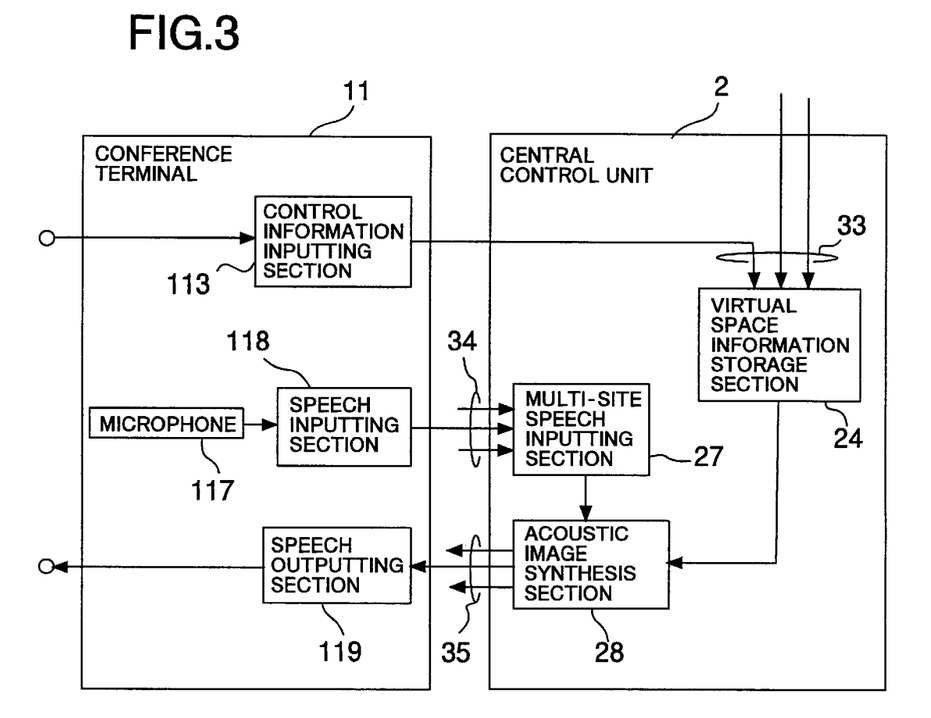
FIG. 3 is a block diagram showing a modification to the image and speech synthesis apparatus for a multi-site conference of FIG. 1.

FIG. 3 shows a modification to the image and speech synthesis apparatus for a multi-site conference described hereinabove with reference to FIG. 1. The image and speech synthesis apparatus for a multi-site conference of FIG. 1 produces video images which provide a good feeling of presence. When an image as viewed from the participant 1A is produced where the images of the participants 1B, 1C and 1D are arranged in order from the left, it is natural that utterance of the participant 1B sounds from the left, utterance of the participant 1C sounds from the front and utterance from the participant 1D sounds from the right. Therefore, the modified image and speech synthesis apparatus for a multi-site conference is constructed such that also speech sounds from a pertaining image.

Referring to FIG. 3, the modified image and speech synthesis apparatus for a multi-site conference shown includes a modified central control unit 2 and modified conference terminals 11 to 14 similarly to the image and speech synthesis apparatus of FIG. 1. It is to be noted that, in FIG. 3, the conference terminals 12 to 14 are omitted in FIG. 3 for simplified illustration. The central control unit 2 and the conference terminals 11 to 14 in the modified image and speech synthesis apparatus for a multi-site conference individually include all respective components of the central control unit 2 and the conference terminal 11 of FIG. 1. However, in FIG. 3, only those components which relate to processing of voice speech are shown for simplified illustration and description.

Each of the conference terminals 11 to 14 additionally includes a microphone 117, a speech inputting section 118 and a speech outputting section 119, and the central control unit 2 additionally includes a multi-site speech inputting section 27 and an acoustic image synthesis section 28.

The microphone 117 of each of the conference terminals 11 to 14 collects sound to produce a speech signal, and inputs the speech signal to the speech inputting section 118. The speech signal is transmitted from the speech inputting section 118 to the central control unit 2. The multi-site speech inputting section 27 of the central control unit 2 receives speech information transmitted thereto from the conference terminals 11 to 14. The acoustic image synthesis section 28 produces acoustic images to be heard from the conference terminals 11 to 14 based on speech information at the sites inputted to the multi-site speech inputting section 27 and arrangement information of the participants stored in the virtual space information storage section 24, and sends the thus produced acoustic images to the conference terminals 11 to 14. In each of the conference terminals 11 to 14, the speech outputting section 119 receives an acoustic image sent thereto and presents corresponding speech to the participant.

Particularly in such arrangement as seen in FIG. 6, in order to produce an acoustic image to be heard by the participant 1A, speech of the participant 1B is produced such that it sounds smaller to the right ear than to the left ear while speech of the participant 1D is produced such that conversely it sounds smaller to the left ear than to the right ear. Since the participant 1C is positioned farther than the participants 1B and 1C, the levels of the sounds which sound to the two ears are lowered a little. Such sounds at the three positions are synthesized into stereo sound. If the stereo sound is sent to the conference terminal of the participant 1A, then the participant 1A can have such a feeling of presence that it is present at the location.

With the modified image and speech synthesis apparatus for a multi-site conference of FIG. 3 described above, since, in addition to images, speech is synthesized with reference to the positions of the conference participants, a better feeling of presence can be provided to each conference participant.

In the modified image and speech synthesis apparatus for a multi-site conference of FIG. 3 described above, production of a video image and an acoustic image is performed by the central control unit 2. Where this construction is employed, as the number of participants to a conference increases, the burden to the central control unit 2 increases, and finally, it becomes difficult for the single central control unit 2 to produce video images and acoustic images of all participants to the conference. One of possible countermeasures for this is to provide a plurality of such central control units so as to allow production of video images and acoustic images of conference participants to be assigned separately to the central control units to suppress a drop of the processing speed.

Figure 4:
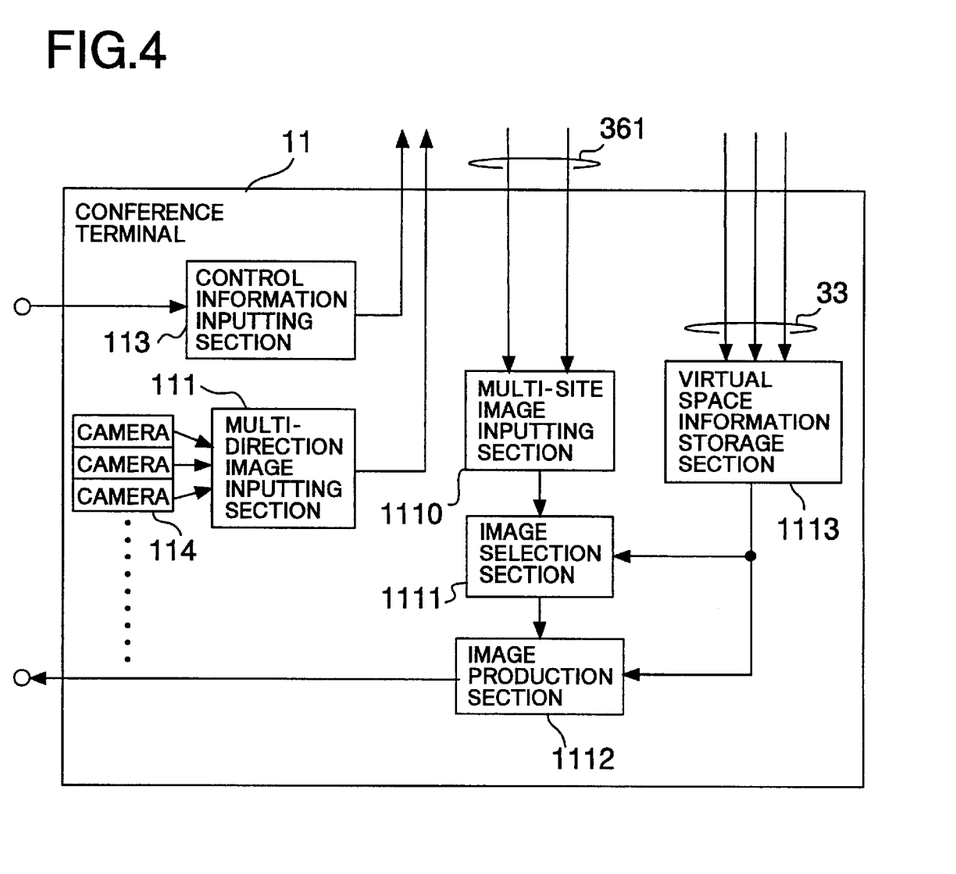
FIG. 4 is a block diagram showing another image and speech synthesis apparatus for a multi-site conference to which the present invention is applied.

Another possible countermeasure is to connect every two of all clients. FIG. 4 shows another image and speech synthesis apparatus for a multi-site conference to which the present invention is applied. The image and speech synthesis apparatus for a multi-site conference of the present embodiment is characterized in that functions of the central control unit 2 of the image and speech synthesis apparatus for a multi-site conference of FIG. 1 are separately allocated to individual conference terminals. Consequently, the image and speech synthesis apparatus for a multi-site conference of the present embodiment does not include a central control unit such as the central control unit 2 described above, but only includes a plurality of conference terminals having a similar construction to each other. In FIG. 4, only one conference terminal 11 is shown as a representative one of such conference terminals.

Referring to FIG. 4, the conference terminal 11 shown picks up images of a participant therefor by means of a plurality of cameras 114 and transmits the images to all of the other clients from a multi-direction image inputting section 111. Meanwhile, images from all of the other clients are inputted to a multi-site image inputting section 1110, and an image selection section 1111 selects necessary images based on arrangement information of the participants stored in a virtual space information storage section 1113. Then, an image production section 1112 produces an image of a virtual conference space using the selected images. The image production procedure is similar to that described hereinabove with reference to the first embodiment.

Further, if a speech synthesis function similar to that shown in FIG. 3 is additionally provided to the conference terminal 11 of the image and speech synthesis apparatus for a multi-site conference of the present embodiment, then an acoustic image of the virtual conference space can be produced similarly by each conference terminal.

Figure 9:
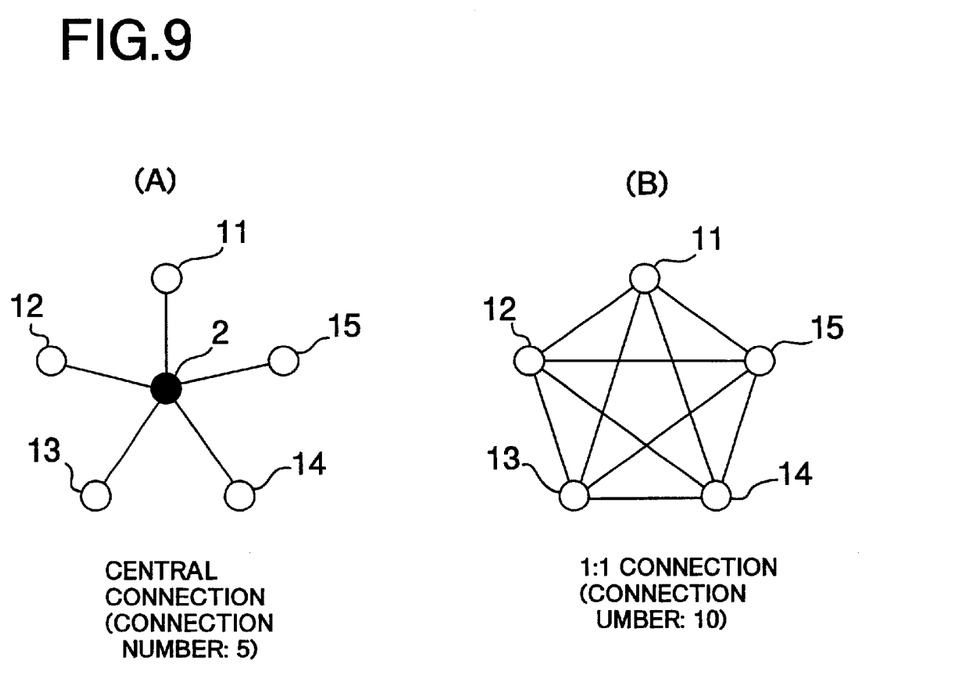
FIGS. 9(A) and 9(B) are diagrammatic views illustrating different forms of connection of conference terminals.

A network for implementing the image and speech synthesis apparatus for a multi-site conference of the present embodiment has such a connection configuration as shown in FIG. 9(B). Specifically, FIG. 9(B) shows a connection configuration for five sites. Where five conference terminals are connected to a central control unit as in the image and speech synthesis apparatus for a multi-site conference of the first embodiment, five connection lines are required as seen in FIG. 9(A). In contrast, in the image and speech synthesis apparatus for a multi-site conference of the embodiment shown in FIG. 4, ten connection lines are required as seen from FIG. 9(B). Although the connection scheme wherein every two participant terminals are connected to each other by a connection line in this manner complicates the network connections, it is advantageous in terms of simplicity in construction of the apparatus where a sufficient capacity of network lines is available. On the other hand, where the image production capacity of the central control unit is high with respect to the network capacity, the central connection system wherein the participant terminals are connected to the central control unit is superior.

With the image and speech synthesis apparatus for a multi-site conference of FIG. 4 described above, it can be well applied to a multi-site television conference system which is small in scale but simple in construction since each conference terminal synthesizes images and speech.

While preferred embodiments of the present invention have been described using specific terms, such description is for illustrative purposes only, and it is to be understood that changes and variations may be made without departing from the spirit or scope of the following claims.

What is claimed is:

1. A multi-site television conference system, comprising:

a central control unit for controlling a conference; and a plurality of conference terminals connected to said central control unit;

each of said conference terminals including a plurality of image pickup apparatus for picking up video images of a participant, who participates in the conference through the conference terminal, from a plurality of directions, a multi-direction image inputting section for receiving the video images from said plurality of image pickup apparatus and transmitting the video images to said central control unit, an image outputting section for receiving a video image of a virtual conference room transmitted thereto from said central control unit and presenting the received video image to the participant, and a control information inputting section for inputting information for controlling the conference therethrough and transmitting the inputted information to said central control unit;

said central control unit including a multi-site image inputting section for receiving video images transmitted thereto from said conference terminals of individual participants to the conference, an image production timing generation section for designating one of the participants who should see a video image to be synthesized by and transmitted from said central processing unit in order that video images may be produced and transmitted to said conference terminals of the individual participants, a virtual space information storage section for storing information to be used for production of a video image of the virtual conference space, updating the information of the virtual conference space with control information from said conference terminals and transmitting the information to be used for production of a video image in response to an instruction from said image production timing generation section, an image selection section for selecting appropriate video images from among the multi-direction video images received by said multi-site image inputting section by distinguishing how, when the participant for which a video image is being produced at present views the participants of the other conference terminals in the virtual conference space based on the information from said virtual space information storage section, the participants look to the participant, and an image production section for producing a video image in which the video images selected by said image selection section are arranged in the virtual conference space based on the information from said virtual space information storage section and transmitting the produced video image to the conference terminal of the participant.

2. A multi-site television conference system as claimed in claim 1, wherein said image selection section of said central control unit has a function of producing, when the multi-direction video images received by said multi-site image inputting section do not include an appropriate video image, an appropriate video image using a plurality of ones of the multi-direction video images.

3. A multi-site television conference system as claimed in claim 1, wherein each of said conference terminals further includes a speech inputting section for inputting speech of the conference participant therethrough and transmitting the inputted speech to said central control unit, and a speech outputting section for receiving speech synthesized by said a central control unit and presenting the received speech to the participant, said virtual space information storage section of said central control unit further being capable of storing information to be used for production of an acoustic image of the virtual conference space, updating the information of the virtual conference space with control information from said conference terminals and transmitting the information to be used for production of an acoustic image, and said central control unit further includes a multi-site speech inputting section for receiving speech transmitted thereto from said conference terminals of the individual participants, and an acoustic image synthesis section for producing an appropriate acoustic image by distinguishing how, when the participant for which speech is being produced hears speech of the participants of the other conference terminals in the virtual conference space based on the information from said virtual space information storage section, the speech sounds to the participant from among the speech from the multi-sites and transmitting the produced acoustic image to the conference terminal of the participant.

4. A multi-site television conference system, comprising:

a plurality of conference terminals located at different sites from each other and connected to each other;

each of said conference terminals including a plurality of image pickup apparatus for picking up video images of a participant, who participates in a conference through the conference terminal, from a plurality of directions, a multi-direction image inputting section for receiving the video images from said plurality of image pickup apparatus and transmitting the video images to the other ones of said plurality of conference terminals connected thereto, a control information inputting section for receiving information for controlling the conference from the participant and transmitting the received information to the other conference terminals, a multi-site image inputting section for receiving video images transmitted thereto from the other conference terminals, a virtual space information storage section for storing information to be used for production of a video image of a virtual conference space, updating the information of the virtual conference space with the control information received from the other conference terminals and outputting the information to be used for production of a video image, an image selection section for selecting appropriate video images from among the multi-direction video images received from the other conference terminals by distinguishing how, when the participant of the conference terminal views the participants of the other conference terminals in the virtual conference space based on the information from said virtual space information storage section, the participants look to the participant of the conference terminal, and an image production section for producing a video image in which the video images selected by said image selection section are arranged in the virtual conference space based on the information from said virtual space information storage section such that the participants of said plurality of conference terminals share the virtual conference space.

5. A central control unit for a multi-site television conference system, comprising:

a multi-site image inputting section for receiving video images transmitted thereto from a plurality of conference terminals;

an image production timing generation section for designating one of participants of said conference terminals who should see a video image to be synthesized by and transmitted from said central processing unit in order that video images may be synthesized and transmitted to said conference terminals;

a virtual space information storage section for storing information to be used for production of a video image of a virtual conference space, updating the information of the virtual conference space with control information received from said conference terminals and transmitting the information to be used for production of a video image in response to an instruction from said image production timing generation section;

an image selection section for selecting appropriate video images from among the multi-direction video images received by said multi-site image inputting section by distinguishing how, when the participant for which a video image is being produced at present views the participants of the other conference terminals in the virtual conference space based on the information from said virtual space information storage section, the participants look to the participant; and an image production section for producing a video image in which the video images selected by said image selection section are arranged in the virtual conference space based on the information from said virtual space information storage section and transmitting the produced video image to the conference terminal of the participant.

6. A central control unit for a multi-site television conference system as claimed in claim 5, wherein said image selection section has a function of producing, when the multi-direction video images received by said multi-site image inputting section do not include an appropriate video image, an appropriate video image using a plurality of ones of the multi-direction video images.

7. A conference terminal for a multi-site television conference system, comprising:

a plurality of image pickup apparatus for picking up video images of a participant, who participates in a conference through said conference terminal, from a plurality of directions;

a multi-direction image inputting section for receiving the video images from said plurality of image pickup apparatus and transmitting the video images to the other conference terminals;

a control information inputting section for receiving information for controlling the conference from the participant and transmitting the received information to the other conference terminals;

a multi-site image inputting section for receiving video images transmitted thereto from the other conference terminals;

a virtual space information storage section for storing information to be used for production of a video image of a virtual conference space, updating the information of the virtual conference space with the control information received from the other conference terminals and outputting the information to be used for production of a video image;

an image selection section for selecting appropriate video images from among the multi-direction video images received from the other conference terminals by distinguishing how, when the participant of the conference terminal views the participants of the other conference terminals in the virtual conference space based on the information from said virtual space information storage section, the participants look to the participant of the conference terminal; and an image production section for producing a video image in which the video images selected by said image selection section are arranged in the virtual conference space based on the information from said virtual space information storage section such that the participants of the other conference terminals share the virtual conference space.

* * * * *